United States Patent
Sauriol et al.

(10) Patent No.: US 8,605,863 B1
(45) Date of Patent: Dec. 10, 2013

(54) METHOD AND APPARATUS FOR PROVIDING STATE INDICATION ON A TELEPHONE CALL

(75) Inventors: Nicholas Sauriol, Ottawa (CA); Arn Hyndman, Ottawa (CA); Paul To, Menlo Park, CA (US)

(73) Assignee: Avaya Inc., Basking Ridge, NJ (US)

( * ) Notice: Subject to any disclaimer, the term of this patent is extended or adjusted under 35 U.S.C. 154(b) by 1380 days.

(21) Appl. No.: 12/344,465

(22) Filed: Dec. 27, 2008

Related U.S. Application Data

(60) Provisional application No. 61/037,447, filed on Mar. 18, 2008.

(51) Int. Cl.
*H04M 1/24* (2006.01)

(52) U.S. Cl.
USPC ..................................................... 379/32.01

(58) Field of Classification Search
USPC ............. 379/201.01, 202.01, 203.01, 204.01, 379/205.01, 207.01, 399.02, 404, 387.02, 379/388.01, 388.02, 388.03, 388.04, 379/388.05, 388.06, 206.01, 420.01, 379/420.02, 420.03, 421, 416, 417, 388.07, 379/390.01, 390.02, 390.03, 392.01, 32.01; 348/14.01, 14.08, 14.09; 715/753; 455/63.1, 67.13, 570, 174.01, 194.01
See application file for complete search history.

(56) References Cited

U.S. PATENT DOCUMENTS

| | | | | |
|---|---|---|---|---|
| 7,590,230 B1* | 9/2009 | Surazski | ................. | 379/202.01 |
| 2003/0112947 A1* | 6/2003 | Cohen | ..................... | 379/202.01 |
| 2005/0281410 A1* | 12/2005 | Grosvenor et al. | ............. | 381/61 |
| 2007/0081644 A1* | 4/2007 | Jachner | ..................... | 379/106.01 |
| 2008/0160976 A1* | 7/2008 | Virolainen et al. | ........... | 455/416 |

* cited by examiner

*Primary Examiner* — Christopher M Brandt
*Assistant Examiner* — Hung Dui
(74) *Attorney, Agent, or Firm* — Anderson Gorecki & Rouille LLP

(57) ABSTRACT

A method and apparatus for providing a state indication on a voice communication session such as a telephone call or communication session implemented as part of a virtual environment enables the quality of the audio on the voice communication session to be altered depending on the state of the communication session. When the communication session is in a state other than normal state, the audio may be colored in a particular manner so that the user can tell, from the quality of the audio, what state the communication session is in. For example, when the client device is on Mute, the audio may be colored to enable the audio to have distinct qualities while on mute that are different than the audio qualities while not on mute. Other types of coloration may be used to indicate other states. In this way, the audio qualities presented to the user may be used to notify the user of the state the communication session.

18 Claims, 5 Drawing Sheets

METHOD AND APPARATUS FOR PROVIDING STATE INDICATION ON A TELEPHONE CALL

CROSS-REFERENCE TO RELATED APPLICATIONS

This application claims priority to U.S. Provisional Patent Application No. 61/037,447, filed Mar. 18, 2008, entitled "Method and Apparatus For Providing 3 Dimensional Audio on a Conference Bridge", the content of which is hereby incorporated herein by reference.

BACKGROUND OF THE INVENTION

1. Field of the Invention

The present invention relates to communication networks and, more particularly, to a method and apparatus for providing state indication on a voice communication.

2. Description of the Related Art

Telephone networks have been in use for many years and have evolved considerably over time. The Public Switched Telephone Network (PSTN) is a circuit network that allows telephone calls to be placed between two or more parties. Voice traffic may also be carried on a packet network such as the Internet using a networking protocol commonly referred to as Voice over IP (VoIP). In addition, cellular and other wireless networks have been developed and deployed to allow users to place and receive telephone calls wirelessly. All of these networks, and other private telephone networks, are interconnected to allow individuals on different types of networks to make and receive telephone calls.

As telephone services are developed, they are deployed on the network so that the new services may be sold to telephone customers. For example, telephone conferencing has been developed which allows two or more parties to be interconnected by a bridge. The bridge mixes audio streams from the participants so that all participants can hear each other on the conference call. On a multi-party conference call, many of the participants will locally Mute their telephone to prevent them from being heard on the telephone conference. This enables one or a small number of people to talk on the telephone call while reducing the amount of ambient noise and unintended contributions from other participants. Where people do not Mute their local microphone, the additional audio on the conference call can be distracting to the other participants on the telephone conference and, in particular instances, may even overwhelm the person that is supposed to be talking to such an extent that the person is not able to be heard on the call. People on two party calls may similarly Mute their local microphone for example to screen out background noise from the telephone call.

It is difficult to determine whether a telephone is in the Mute state or in a live state. Some telephones do not provide any indication as to whether the telephone is Muted or not. Since the Mute button may not always function properly, the person will need to rely on other people on the telephone call to let them know that the Mute button is not working Additionally, the user will need to rely on memory to keep track of whether the telephone is in the Mute state or in the live state.

Other telephones provide a visual indication as to whether the phone is in the Mute state. This solution is straightforward and works well in many situations. However, there are times when this solution is less than optimal. For example, if the user is doing other unrelated tasks while listening on the telephone call, the user may not be focused on the telephone and, hence, may not be able to see the light that indicates whether the phone is in Mute state or not. Similarly, the user may not be able to look at the indicator, such as where the user is driving or when the indicator is on the handset, so that the user may not be able to see what state the telephone is in throughout the conference call. In these and other situations, it is easy for a user to lose track as to whether the audio is on Mute or live.

Other features may be implemented on a telephone call as well. For example, the call may be recorded, a second call may arrive while the user is on the first call, and other events may occur. Depending on the capabilities of the telephone, the user may be totally unaware of these changes in call state. Although the change in state may be audibly indicated to the user, such as by pausing the audio and inserting a beep, this type of interruption may be found to be inconvenient to the people on the call. Accordingly, it would be advantageous to have a method and apparatus for providing a state indication on a telephone call.

SUMMARY OF THE INVENTION

A method and apparatus for providing a state indication on a voice communication session such as a telephone call or communication session implemented as part of a virtual environment enables the quality of the audio on the voice communication session to be altered depending on the state of the communication session. When the communication session is in a state other than normal state, the audio may be colored in a particular manner so that the user can tell, from the quality of the audio, what state the communication session is in. For example, when the client device is on Mute, the audio may be colored to enable the audio to have distinct qualities while on mute that are different than the audio qualities while not on mute. Other types of coloration may be used to indicate other states. In this way, the audio qualities presented to the user may be used to notify the user of the state the communication session.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
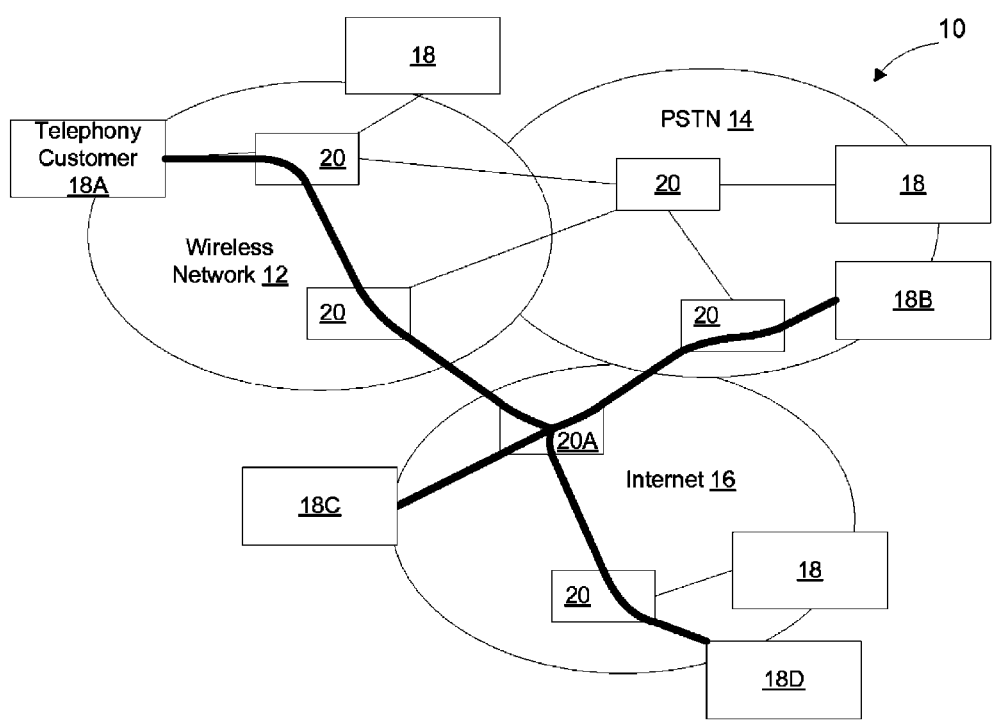
FIG. 1 is a functional block diagram of a reference communication network and showing an example conference communication session interconnected through the reference communication network.

FIG. 1 shows an example network 10, including a wireless network 12, the Public Switched Telephone Network (PSTN) 14, and the Internet 16. The portions of the network have been shown as separated for convenience—in reality the three networks often are coextensive geographically, such that a given telephony customer 18 may be able to connect to all three networks at the same time using the same or different pieces of user equipment. For example, a telephony customer may connect to the Internet via a computer with Internet access, may talk on a telephone that is connected to the PSTN, and may also have a cellular telephone with access to a wireless network. Additionally, the customer may use a telephony program running on a computer and talk with people connected to the network. The invention is not limited by the particular network selected to implement a portion of the invention, as the invention may be implemented in any of these network areas.

Telephony customers 18 connect to the network of their choice. For example a wireless customer may make a wireless telephone call on the wireless network or may access the internet through their wireless telephone or laptop computer. Similarly, a different telephony customer may place a telephone call on the PSTN or may access the Internet using a computer through the PSTN via a dial-up connection, a DSL connection, or other connection. Other customers may place a telephone call on the Internet, by accessing the internet via satellite, cable modem, or another manner. Other customers may engage in voice communication with other customers while engaged in a virtual environment. For example, a three dimensional computer generated virtual environment may automatically or on demand establish a communication session between users of the virtual environment so that the users of the virtual environment can talk with each other. There are multiple ways in which telephony customers may place telephone calls and the invention is not intended to be limited to the particular way in which the telephony customer accesses the network.

As used herein, the term communication session will be used to refer to an audio and/or video session during which users are allowed to communicate with each other audibly. Two examples of communication sessions are telephone calls and communication sessions implemented in connection with virtual environments. There are many types of telephone calls, which may be implemented for example using a digital client on a personal computer, an IP telephone, a standard telephone connected to the telephone network, or in another type of way.

Within the networks, various network elements 20 are used to allow data to be passed between telephony customers. There are many known network architectures that may be used to implement the underlying networks, and the invention is not limited to any particular architecture. FIG. 1 has shown several network elements 20 in each network interconnected with each other and interconnecting the various aspects of the network 10. The network elements may be implemented in a manner particular to the network on which they reside. Thus, for example, a "network element" in the wireless network may be different than a "network element" on the Internet or a "network element" on the PSTN. Since the particular network element chosen to implement the connection is irrelevant to the invention, these various devices have been collectively referred to as "network elements". Thus, the term "network element" as used herein is to be considered a generic term for a device that sits on a network and is capable of performing telephony services on behalf of telephony users.

When more than two people are interested connecting to the same communication session such as a telephone conference call, an audio bridge may be used to implement a multiparty communication session. An example of a multiparty communication session interconnecting customers 18A-18D is shown in dark lines in FIG. 1. The bridge hosting the multiparty communication session may be a logical bridge implemented on one of the network elements. In the example shown in FIG. 1, the logical bridge is implemented at network element 20A. The location of the bridge is immaterial to the concepts discussed herein. Although an embodiment will be described in connection with a multiparty communication session, the invention may be applied to standard two-party communication session as well.

In the example shown in FIG. 1, the multiparty communication session is show as being established between customer 18A on wireless network 12, customer 18B on the PSTN, and customers 18C and 18D connecting on VoIP connections established through the Internet. The multiparty communication session may be implemented by a bridge such as the bridge shown in FIG. 7 instantiated as a process on network element 20A, or may be otherwise implemented depending on the particular way in which the networks are configured to establish communication sessions on the network. The invention is not limited to the particular manner in which the communication session is established or how it is implemented on the underlying network elements. For example, the multiparty communication session may be hosted by a application resident on one or more of the network elements 20 of FIG. 1. In the illustrated embodiment the network element hosting the multiparty communication session has been shown as resident on the Internet. The invention is not limited in this manner as the network element hosting the bridge for the multiparty communication session could equally have been implemented on the PSTN or the wireless network.

According to an embodiment of the invention, when a customer on a communication session such as a multiparty communication session elects to have the audio that they are generating not transmitted on the multiparty communication session, conventionally referred to as putting the call on Mute, the user may press a button or otherwise use an interface on the telephone or computer that they are using to access this feature. When the user is on Mute, any noise generated by the user will not be transmitted over the multiparty communication session so that other participants to the multiparty communication session will not hear the user. To enable the user to know whether they are on Mute, the audio that is received is altered before being played to the user, so that the user is able to discern from the tone quality of the audio, that they are on Mute. This provides a state indication to the user as to the state of the communication session, so that the user knows whether they are on Mute or are fully connected to the multiparty communication session.

Other events may occur during the communication session or may be implemented while the communication session is in progress. The user may want to be notified of these events or of the overall status of the communication session. Aspects of the communication session will be referred to herein as the "state." Mute is one feature which affects the state of the communication session such as the state of a telephone call. When the user is in Mute state, audio generated by the user is not transmitted to the other users over the communication session. Other features may affect the communication session as well and, hence, be reflected in the state of the communication session. For example, one or more of the users may record portions of the communication session. The communication session may be recorded locally such that only the user's contribution is recorded or the entire conversation (all users' contributions) may be recorded. Whether a communication session is being recorded may be reflected in the state.

When a user is talking on one communication session and another communication session (i.e. a second telephone call) comes in for that user, the existence of the second call may be reflected in the state for that user. Additionally, the user may be engaged in a side conversation with another user on the communication session, on a separate communication session, or may be invoking other special features. All of these aspects may be reflected in the state of the communication session. According to an embodiment of the invention, the state of the communication session is reflected in the audio. Preferably the audio is altered in a way that helps convey the state information to the user. For example, where the user is in mute state, the main audio may be muffled slightly. Where the communication session is being recorded, a high frequency hiss and squeak coloration may be added, similar to the sound of an old tape recorder. When the user is presenting to a large group of other people on the communication session, some reverb may be added to the audio to make it sound like the user is speaking in a large auditorium. Thus, the color that is added to the audio may be related to the state to be conveyed such that the user can discern from the color of the audio the state of the communication session. Of course, more than one state may occur at the same time so that the audio to a particular user may reflect multiple states and be colored using a combination of individual state colorations.

As used herein, the term "telephone" will be used to refer to an electronic device that is used to enable a person to talk to another person at a remote distance. There are many types of telephones that have been developed and are likely to be developed over time. For example, analog and digital telephone handsets are commonly used in residential and business settings to connect to the Public Switched Telephone Network (PSTN). Mobile, cellular, telephones are used to place phone calls on a cellular network. More recently, communication session have been able to be placed on Internet Protocol (IP) networks such as the Internet. Any type of a device that connects to an IP network and is capable of running a Voice over IP (VoIP) client may be used to make a telephone call on this type of network. For example, personal computers, laptop computers, Personal Data Assistants (PDAs) and other similar computing devices may be used. All of these devices fall within the definition of "telephone" as that term is used herein.

Figure 7:
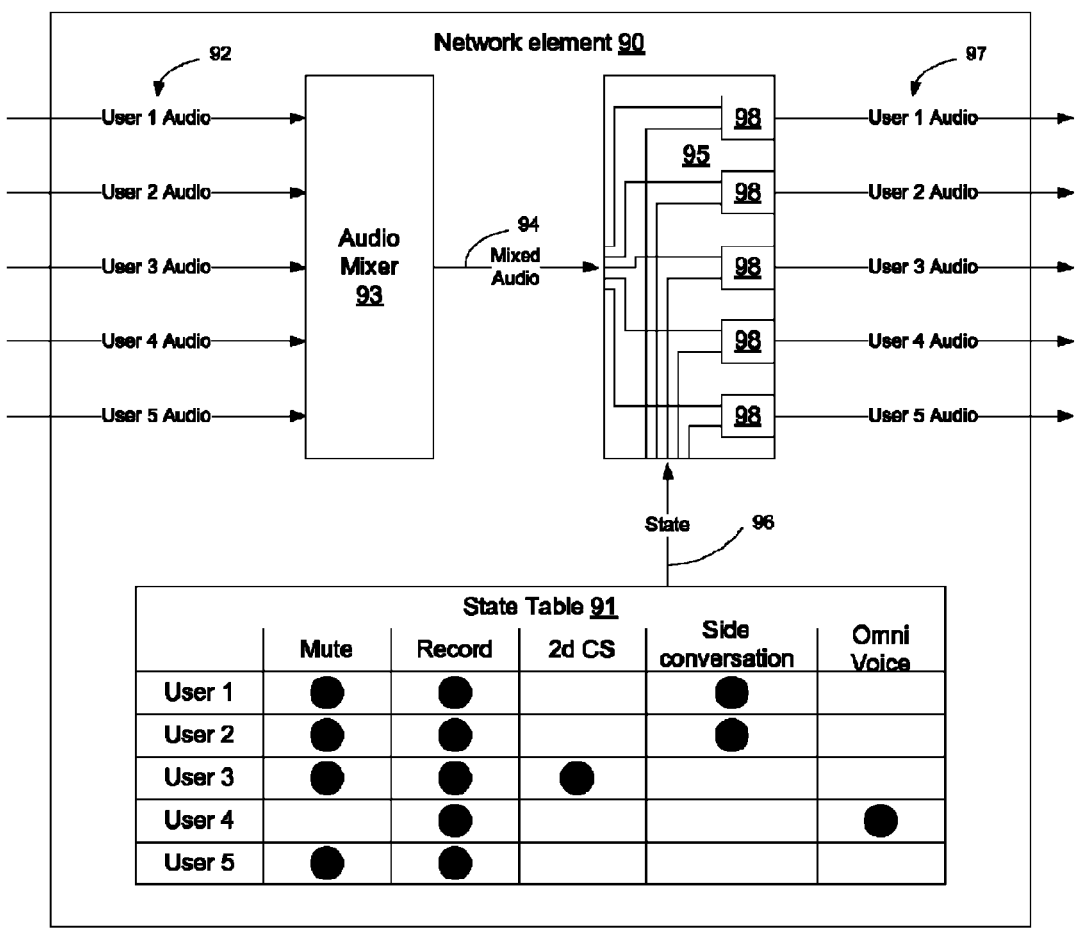
FIG. 7 is a functional block diagram of a network element that may be used to implement audio coloration to indicate state according to an embodiment of the invention.

As noted above, when the state of the communication session is other than normal, i.e., the user elects to put a communication session on Mute, the audio that is presented to the user on the communication session will be altered to enable the user to know that the communication session is in a different state. This may be implemented in several ways. FIGS. 2 and 3 show two examples of how the audio on the communication session may be altered to enable the communication session state to be indicated to the user. In the embodiment shown in FIG. 2, audio alteration is implemented at the user's telephone. In the embodiment shown in FIG. 3, audio alteration is implemented at a network element before it reaches the user's telephone. FIG. 7 shows an example bridge in somewhat greater detail to show how the bridge may individually color audio for each user. FIGS. 2 and 3 show examples where a mute button is used to affect the state of the communication session. The same process may be used for other types of state as well.

Figure 2A:
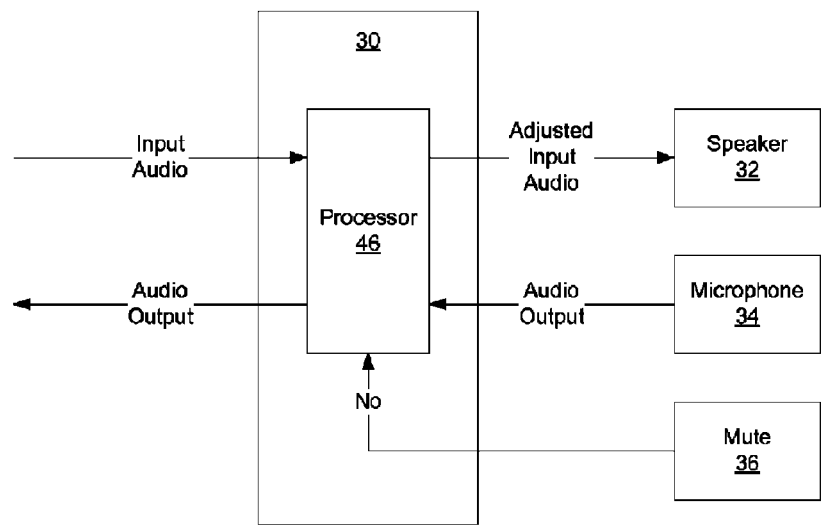
FIGS. 2A and 2B show an embodiment in which the state indication is provided by the user's communication client according to an embodiment of the invention.
Figure 2B:
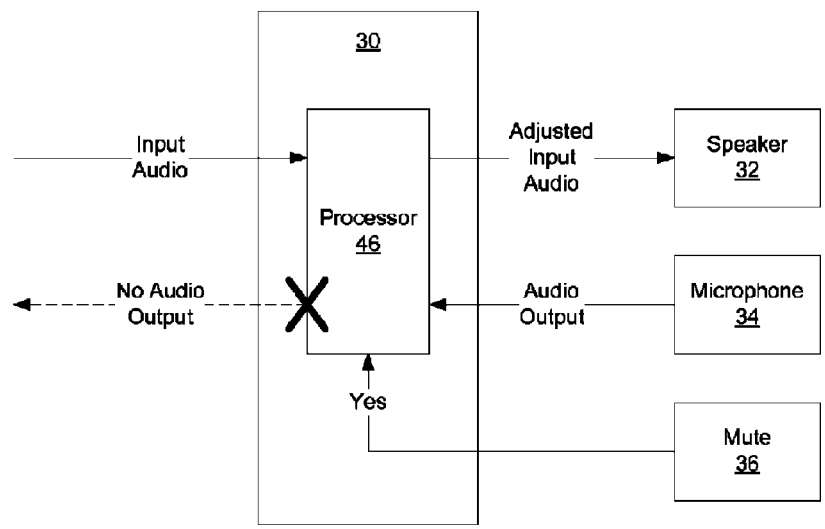

FIGS. 2A-2B show an embodiment where the communication session state indication is implemented locally, such as on a user's telephone or computer-based telephony application, according to an embodiment of the invention. As shown in FIGS. 2A and 2B, the audio client 30 the user is using to connect to the communication session will have or connect to one or more speakers 32 to play audio to the user and will have or connect to one or more microphones 34 to receive audio from the user. The speaker and microphone may be implemented in a hand-held handset, in the telephone base, in a wireless/wired device such as a headset, as part of a computer or computer monitor, or in another manner. The invention is not limited in the manner the speaker and microphone are implemented on the telephone and will generally depend on the design of the telephone.

As shown in FIGS. 2A-2B, the device will also include a Mute button 36. A telephone, such as a standard telephone, mobile phone, computer telephony client, etc., may have a user interface that includes a key that will enable the user to elect to not output audio on a communication session. The user is still connected to the communication session, but the communication session is set such that the user receives audio on the communication session but does not transmit audio on the communication session. This feature will be referred to herein as "Mute." Depending on the particular type of telephone in use by the user, the Mute button may be a physical button on the face of the telephone, a softkey that has the function of enabling the user to indicate that the Mute feature should be implemented, or a clickable button on a graphical user interface (such as on a VoIP client interface on a computer). All of these types of interfaces will be referred to as "Mute Buttons." The term "button" is not intended to be limited to a device that is physically pressable, but rather encompasses any feature that may be accessed by a user to elect to cause the call enter the Mute state.

The device will also generally include some processing circuitry such as processor 46 that enables the device to receive signals from the network and convert the signals into audio for presentation to the user via the speaker 32. The processing circuitry will also enable audio received from the user via microphone 34 to be converted into signals for transmission to the other users on the communication session. In a telephone, the processor 46 may be dedicated to the device whereas in a general purpose computer the processor may be implemented as a process on the central processing unit. The invention is not limited to implementation on a particular type of processor as many types of processors may be used to color the audio to indicate communication session state as described herein.

In the embodiment shown in FIGS. 2A and 2B, a processor 46 provided to adjust the input audio to indicate the state of the communication session. Specifically, the processor 46 may color the input audio when the communication session is on Mute to enable the user to know, from the qualities of the audio, the state of the communication session.

In the embodiment shown in FIG. 2A, the telephone has not pressed the Mute button. Accordingly, the processor 46 has not adjusted the input audio. In the embodiment shown in FIG. 2B, the user has pressed the Mute button. This causes the processor 46 to block the output audio and also to adjust the input audio to enable the user to discern, from the audio being output from speaker 32, that the communication session is in the Mute state.

Figure 3A:
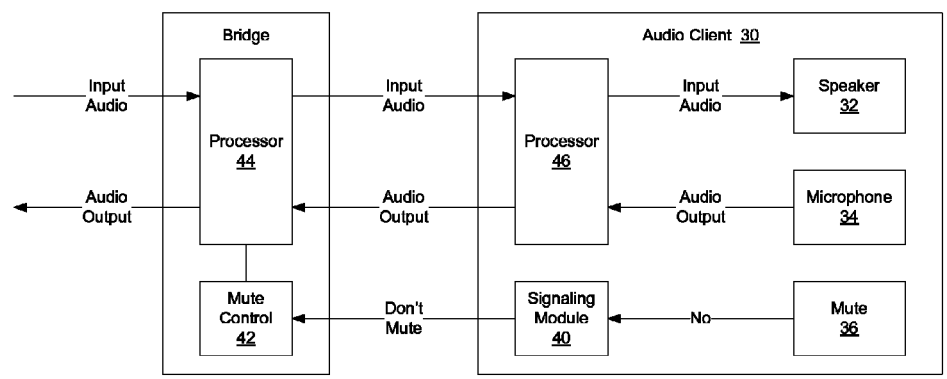
FIGS. 3A-3C show embodiments in which the call state indication is provided by a network element other than the user's communication client according to an embodiment of the invention.
Figure 3B:
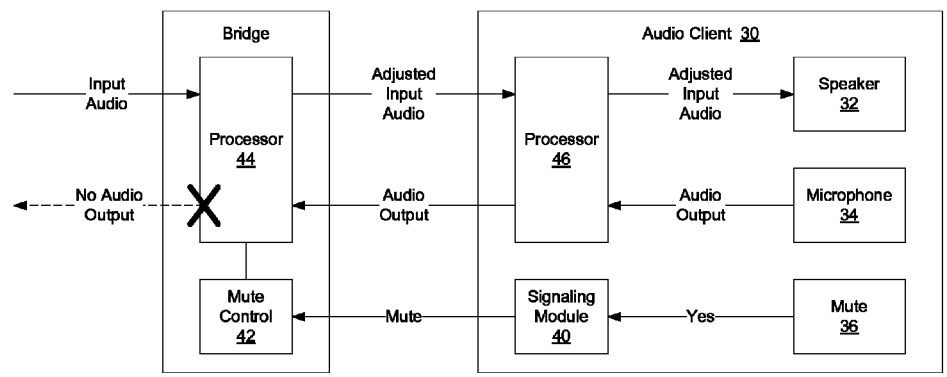
Figure 3C:
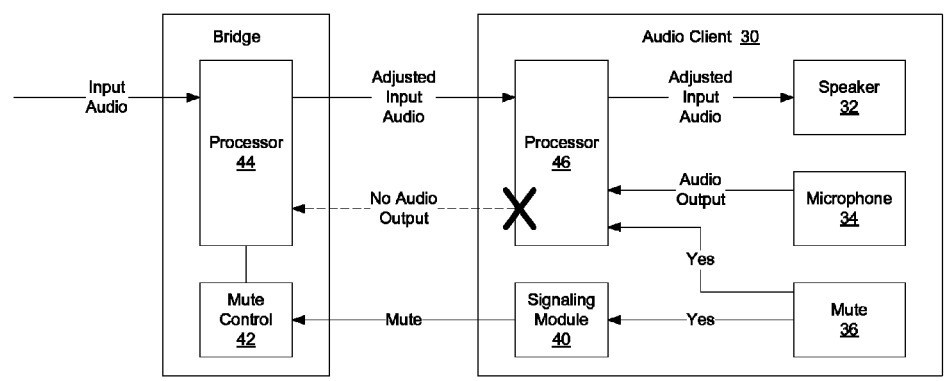

FIGS. 3A-3C show another embodiment in which the audio is colored by a network element other than the user's telephone. This may be implemented on the bridge that is hosting the communication session or at another location on the network. Since the state may be different for each participant to the communication session, preferably the audio presented to each user may be individually colored. FIG. 7 shows an embodiment that may be used to color audio for each user, as described in greater detail below.

In the embodiment shown in FIGS. 3A-3C, when the user presses the Mute button, the Mute state will be indicated to a signaling module 40 that will send a signal to a Mute control 42 on the network element. The signaling module may be a Dual Tone Multi Frequency (DTMF) signaling module, may implement Session Initiation Protocol (SIP) signaling, or may be implemented in another manner. The Mute control on the network element will interface with a processor 44 on the network element to cause the network element to selectively adjust the audio for that user so that the user is able to determine, from the audio, the user's state on the communication session.

For example, as shown in FIG. 3A, if the user is not on Mute, the signaling module will indicate that the user is not on Mute, so that the audio bridge will transmit normal audio to the user's telephone. If the user presses Mute, as shown in FIG. 3B, this state will be conveyed by the signaling module to the Mute control. The Mute control will block the user's audio at the audio bridge so that the audio is not conveyed to the other participants. The Mute control will also cause the processor 44 to adjust the audio to enable the user to discern from the audio that the communication session is on Mute.

FIG. 3C shows a similar example, except that the processor on the user's telephone is responsible for blocking output audio. In this example, the Mute indication is sent both to a processor 46 on the user's telephone to prevent audio from being transmitted on the communication session, and to the signaling module that will enable the Mute state to be conveyed to the audio bridge, so that the audio bridge may color the audio to enable the communication session state to be determined simply from listening to the qualities of the audio on the communication session.

Although particular components are shown, such as processors, signaling modules, Mute control, and digital signal processors, the functionality described in connection with these various components may be merged together in different embodiments to enable the functionality to be implemented in different ways. The invention is not limited to an embodiment that uses these particular components, therefore, but rather these figures are merely intended to show particular examples of a few ways that the functionality may be implemented. The particular components selected to implement the functions will thus depend on the particular way that the components of the network element and telephone are implemented.

Figure 4:
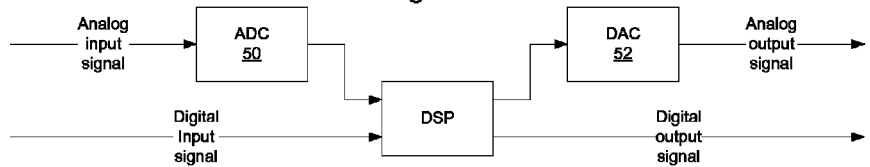
FIG. 4 is a functional block diagram showing how call state indication may be implemented for both analog and digital inputs and outputs.

In the embodiment shown in FIGS. 2A-2B and 3A-3C, the state of the communication session is indicated by causing the audio on the communication session to be altered. This is implemented, in the illustrated embodiments, through the use of digital signal processing techniques. However, not all communication sessions involve the transmission of digital signals, and not all telephones output digital audio. Where portions of the signals are analog, as shown in FIG. 4, an Analog to digital converter 50 may convert analog input signals to digital signals for processing by the digital signal processor. Similarly, the digital signals output from the digital signal processor may be converted into analog signals, if desired, using a digital to analog converter 52. Conversion between digital and analog signals is well known in the art and the invention is not limited to an embodiment that utilizes one particular signal format.

The processor 44 may be implemented as a stand-alone processor, a portion of another processor on the telephone or the network element, or may be implemented as a process in a general purpose computer processor such as a CPU. The invention is not limited by the particular hardware selected to process the audio signals to provide the communication session state indication described herein.

Pschoacoustics classifies six characteristics of sound: (1) Pitch, which is also associated with frequency, is the perception of high or low sound; (2) loudness, also called amplitude, which is the intensity of a sound; (3) phase, which is the increase and decrease in pressure cycle for any single sound vibration; (4) direction, which relates to stereo sound, and is the perception that hearing with two ears creates when there is a difference between left/right, up/down, or front/back; (5) distance, which is associated with reverberation, and is the perception of how near or far away a sound source is; and (6) timbre, also called tone color, and is the perceived quality of any sound's multiple frequencies changing through time.

According to an embodiment of the invention, one or more of the sound qualities may be adjusted to alter the audio and indicate the state of the user on the telephone call. Different combinations of these qualities may be used to indicate different types of state. For example, where the user is on mute, the main audio may be muffled by clipping off the higher pitch sound to give a slightly muffled quality to the sound. The quality of the audio may be adjusted in other ways as well to indicate other types of state of the call such as whether the call is being recorded, whether the user is the presenter, whether there is another call waiting, whether the user is engaged in a side peer-to-peer conversation on the main communication session, and numerous other states. In addition to adjusting one or more qualities of the sound, additional sound may be mixed into the sound as well to combine the original audio with a second audio. For example, a hissing sound may be mixed into the original audio to make the audio include the hissing sound.

In a virtual environment such as an on-line game or a virtual business environment, an audio bridge may be established to enable many users to talk with each other. The audio bridge may be implemented in many ways such as to automatically connect users within a particular distance of each other within the virtual environment. The user may have special features in the virtual environment that enable the user to broadcast their voice farther than normal (referred to herein as OmniVoice). When the user is invoking one of these special features, this may be reflected on the communication session as state, to enable the communication session audio to be colored to remind the user that they are invoking the special feature within the virtual environment.

Figure 5:
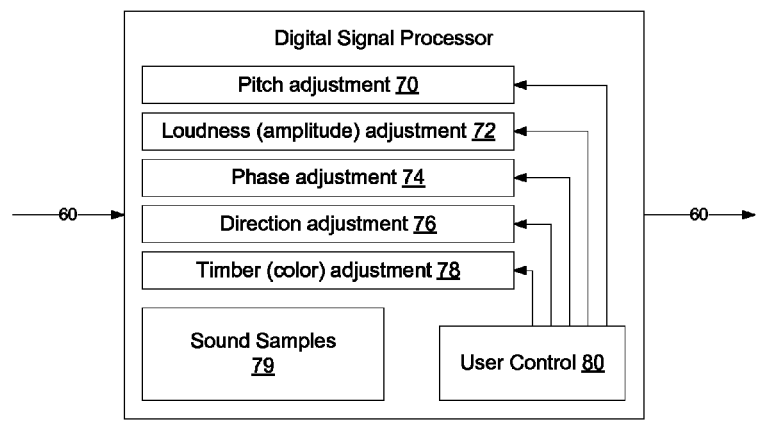
FIG. 5 is a functional block diagram of a digital signal processor that may be used to implement state indication in a conference setting according to an embodiment of the invention.

FIG. 5 shows an example digital signal processor that may be used to implement processor 44 on the network bridge or processor 46 on audio client 30, and shows some of the types of processing that may be used to alter the original input audio

60 to provide output audio 62 that contains an indication of the communication session state according to an embodiment of the invention. As shown in FIG. 5, the digital signal processor is configured to take an input audio stream 60 and selectively adjust one or more properties of the audio stream to generate an adjusted audio stream 62. In the embodiment shown in FIG. 5, the digital signal processor contains control logic that will allow the input audio signal to be processed to implement pitch adjustment 70, loudness (amplitude) adjustment 72, phase adjustment 74, direction adjustment 76, and/or timber (color) adjustment (78). Combinations of these adjustments may be implemented depending on the particular embodiment and the state to be indicated. Additionally, existing audio sound samples 79 may be mixed into the audio. Although one example set of functional modules has been shown as implemented in the digital signal processor, the invention is not limited to this particular example. Thus, combinations of these functional modules may used or other functional modules may be used and the invention is not limited to this particular embodiment. The digital signal processor may implement audio mixing for each user individually.

Audio processing using digital signal processing is well known in the art, and accordingly the particular control logic to be used to adjust one or more of the qualities of the input audio will not be described in greater detail. Rather, the particular implementation will depend on the particular digital signal processor selected to implement an embodiment of the invention, and selection of the appropriate control logic to implement the desired audio adjustment for the selected digital signal processor would be well within the skill of a person of ordinary skill in the art.

Figure 6:
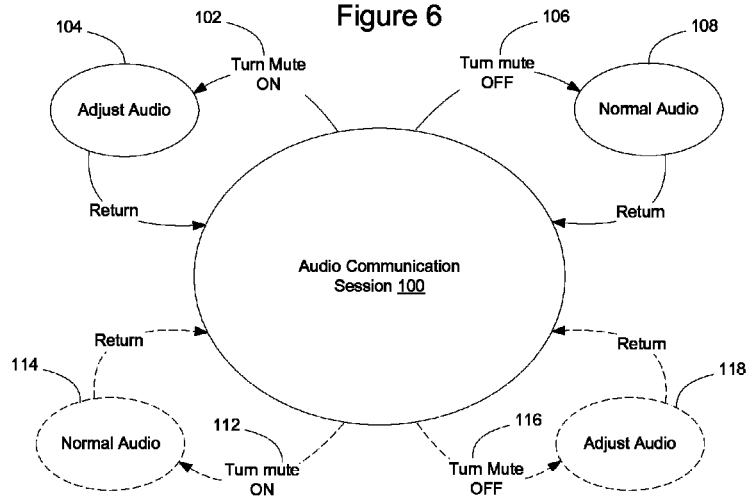
FIG. 6 illustrates example flow logic that may be utilized to provide state indication on a communication session according to an embodiment of the invention.

As shown in FIG. 6, in a first embodiment (solid lines), during an audio communication session (100), if the user elects to enter Mute state (102) the audio that is being provided to the user will be adjusted (104). If the user later elects to turn the Mute off (106), normal audio will be provided to the user (108). This embodiment results in the user hearing normal audio while not on Mute and hearing altered audio while on Mute. The difference in audio output enables the user to have a continuous reminder of the mute state of their telephone throughout the duration of the communication session, and without requiring the user to be able any indicator associated with activation of the mute feature via the mute button.

Not all communication session participants may wish to hear altered audio while on Mute. Particularly where the user anticipates spending most of the time listening on the communication session, and not speaking a great deal on the communication session, the user may prefer to hear normal audio while on Mute and hearing altered audio while not on Mute. This embodiment is shown in FIG. 6 using the dashed lines. Specifically, in the embodiment shown in dashed lines, during an audio communication session (100), if the user elects to enter Mute state (112) the audio that is being provided to the user will be normal (114). If the user later elects to turn the Mute off (116), adjusted audio will be provided to the user (118). This embodiment results in the user hearing normal audio while in the Mute state, and hearing altered audio while not in the Mute state.

Optionally a user control 80 (see FIG. 5) may be provided to enable the user to adjust how the input signals are adjusted. Different users may have different preferences as to how the sound may be adjusted, which may depend on their background and hearing abilities. The user control may 80 may enable the user to alter how the digital signal processor adjusts the signals so that the user can hear the audio clearly, yet still recognize what state the communication session is in so that the user is not confused as to whether the communication session is in the Mute state or not.

FIG. 7 shows an embodiment that may be implemented by a bridge to enable each user's audio to be individually colored. In the embodiment shown in FIG. 7, the network element 90 includes a state table 91. The state table contains an indication of the communication session sate for each user. In the illustrated example, it has been assumed that there are five users. The table may be scaled to accommodate as many users as desired. The state table in this example includes an entry to indicate whether the user is in mute state, whether the communication session is being recorded, whether there is a second Communication Session (CS) pending for that particular user, whether the users are engaged in a side conversation on the main communication session, and whether the user has invoked a special feature such as OmniVoice. Other states may be included as well.

The network element 90 receives audio 92 from each of the users, which is input to a mixer 93. The network element will mix the audio from the various users to create mixed audio 94. The mixed audio is input to a coloration processor 95 which receives state information 96 for each user and individually colors the output audio stream for each user 97. A separate coloration process 98 may be used to individually color the audio that is output to each user according to the state of that user contained in the state table. FIG. 6 shows graphically how the call state for each user is used to individually color audio for individual users by operating on the mixed audio. The multiple coloration processes 98 may be implemented as a single process in a single processor, as separate processes in the same processor, or as separate processes in separate processors within the network element depending on how the communication session is being implemented by the network element. By processing each output audio stream depending on the state of that user, each user may have their audio individually reflect their state on the communication session.

It should be understood that all functional statements made herein describing the functions to be performed by the methods of the invention may be performed by software programs implemented utilizing subroutines and other programming techniques known to those of ordinary skill in the art. Alternatively, these functions may be implemented in hardware, firmware, or a combination of hardware, software, and firmware. The invention is thus not limited to a particular implementation.

It will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of providing state indication on a communication session, the method comprising the steps of:
    obtaining an audio stream;
    determining a state of the communication session;
    outputting the audio stream without coloration if the state of the communication session is in a first state; and
    adjusting the audio stream and outputting the adjusted audio stream if the state of the communication session is in a second state, the second state being a mute state;
    wherein the step of determining the state of the communication session determines whether the communication session is in the mute state; and
    wherein when the communication session is in the mute state, the step of adjusting the audio stream comprises reducing high pitched frequencies of the audio stream to make the audio stream sound muffled.

2. The method of claim 1, wherein the communication session is a telephone call.

3. The method of claim 1, wherein the communication session is implemented as part of a three dimensional virtual environment.

4. The method of claim 1, wherein the step of determining is performed on a per-user basis.

5. The method of claim 1, wherein the step of adjusting the audio stream enables the audio stream to be adjusted to provide a state notification to a person receiving the audio stream.

6. The method of claim 1, wherein the step of adjusting the audio stream comprises mixing in an existing sound sample into the audio stream.

7. A method of providing state indication on a communication session, the method comprising the steps of:
    obtaining an audio stream;
    determining a state of the communication session;
    outputting the audio stream without coloration if the state of the communication session is in a first state; and
    adjusting the audio stream and outputting the adjusted audio stream if the state of the communication session is in a second state, the second state being a state in which the communication session is being recorded;
    wherein the step of determining the state of the communication session determines whether the communication session is being recorded; and
    wherein when the communication session is being recorded, the step of adjusting the audio stream comprises adding high pitched static to the audio stream.

8. A method of adjusting audio qualities of audio being transmitted on a multi-party communication session to indicate per-user communication session state on the multi-party communication session, the method comprising the steps of:
    receiving input audio from a plurality of users to the multi-party communication session;
    mixing the audio to form mixed audio;
    receiving per-user communication session state information for each user to the multi-party communication session; and
    individually coloring mixed audio to be output to each user according to the per-user communication session state information of that user to provide each user with an audible indication of the state of the user on the multi-party communication session;
    wherein the per-user communication session state information includes, for each user, whether the user is in a mute state; and
    wherein when the per-user communication session state is in the mute state, the step of individually coloring the mixed audio to be output to the user in the mute state comprises reducing high pitched frequencies of the audio stream to make the audio stream to be output to the user in the mute state sound muffled.

9. The method of claim 8, wherein the per-user communication session state information includes at least two types of state information for each user, and wherein the step of individually coloring audio to be output to each user comprises coloring the audio differently for different combinations of the types of state information.

10. The method of claim 8, further comprising the steps of: receiving user input from at least one of the users to the multi-party communication session indicative of a change of communication session state of the user on the multi-party communication session; and changing the way in which the audio to be output to that user is colored to reflect the change of communication session state of the user on the multi-party communication session.

11. The method of claim 10, wherein the user input is a request to enter mute state by the user; and wherein the step of changing the way in which the audio to be output to that user is colored comprises adjusting the output audio for that user to enable the user to audibly determine from the output audio that the communication session state includes the mute state.

12. The method of claim 10, wherein the step of individually coloring audio to be output to each user according to the per-user communication session state information comprises adjusting at least one of a pitch, loudness, phase, direction, and timber of the mixed audio.

13. The method of claim 12, wherein the step of individually coloring changes the mixed audio so that a character of the sound is recognizable, but without affecting comprehension of content of the mixed audio.

14. A method of adjusting audio qualities of audio being transmitted on a multiparty communication session to indicate per-user communication session state on the multi-party communication session, the method comprising the steps of:
    receiving input audio from a plurality of users to the multi-party communication session;
    mixing the audio to form mixed audio;
    receiving per-user communication session state information of multi-party communication session indicating whether the multi-party communication session is being recorded; and
    individually coloring mixed audio to be output to each user according to the per-user communication session state information to provide each user with an audible indication that the multi-party communication session is being recorded;
    wherein when the multi-party communication session is being recorded, the step of individually coloring the mixed audio to be output to the user participating on the multi-party communication session comprises adding high pitched static to the mixed audio.

15. The method of claim 14, further comprising receiving per-user communication session state information from the plurality of users to the multi-party communication session, and wherein the step of individually coloring audio to be output to each user comprises coloring the audio differently for different combinations of types of state information.

16. The method of claim 14, further comprising the steps of:
    receiving user input from at least one of the users to the multi-party communication session indicative of a change of communication session state of the user on the multi-party communication session; and changing the way in which the audio to be output to that user is colored to reflect the change of communication session state of the user on the multi-party communication session.

17. The method of claim 16, wherein the step of individually coloring audio to be output to each user according to the per-user communication session state information comprises adjusting at least one of a pitch, loudness, phase, direction, and timber of the mixed audio.

18. The method of claim 17, wherein the step of individually coloring changes the mixed audio so that a character of the sound is recognizable, but without affecting comprehension of content of the mixed audio.

* * * * *